(12) United States Patent
Dutta-Choudhury et al.

(10) Patent No.: US 6,920,241 B1
(45) Date of Patent: Jul. 19, 2005

(54) SYSTEM AND METHOD FOR BUNDLED LOCATION AND REGIONAL INSPECTION

(75) Inventors: Paul Dutta-Choudhury, Franklin, MA (US); Bradford Safford, Framingham, MA (US); Joseph Scola, Medfield, MA (US)

(73) Assignee: Cognex Corporation, Natick, MA (US)

( * ) Notice: Subject to any disclaimer, the term of this patent is extended or adjusted under 35 U.S.C. 154(b) by 570 days.

(21) Appl. No.: 09/672,493

(22) Filed: Sep. 29, 2000

(51) Int. Cl.[7] .............................. G06K 9/00; G09G 3/34
(52) U.S. Cl. .................... 382/141; 382/160; 348/86; 348/125
(58) Field of Search ................................ 382/141–152, 382/160; 348/86–95, 125–134

(56) References Cited

U.S. PATENT DOCUMENTS

| | | | | |
|---|---|---|---|---|
| 4,794,648 A | * | 12/1988 | Ayata et al. ................. | 382/151 |
| 5,640,200 A | * | 6/1997 | Michael ........................ | 348/87 |
| 5,668,874 A | * | 9/1997 | Kristol et al. ................ | 713/186 |
| 5,689,620 A | * | 11/1997 | Kopec et al. .................. | 706/12 |
| 5,796,868 A | * | 8/1998 | Dutta-Choudhury .......... | 382/199 |
| 5,949,905 A | * | 9/1999 | Nichani et al. ............. | 382/173 |
| 6,035,072 A | * | 3/2000 | Read ........................... | 382/275 |
| 6,240,208 B1 | * | 5/2001 | Garakani et al. ............ | 382/190 |
| 6,333,992 B1 | * | 12/2001 | Yamamura et al. .......... | 382/149 |
| 6,366,688 B1 | * | 4/2002 | Jun et al. ..................... | 382/145 |
| 6,608,920 B1 | * | 8/2003 | Su et al. ...................... | 382/144 |

* cited by examiner

*Primary Examiner*—Bhavesh M. Mehta
*Assistant Examiner*—Aaron Carter

(57) ABSTRACT

A system and method for object inspection incorporates a level of hierarchy so that a single, primary alignment may be performed to generate a pose for multiple inspection regions. As a result, a Training mode may include the specification of a single alignment model window and a list of associated inspection region windows. Similarly, a Run-time Inspection Mode may also include specification of a single alignment model window and a list of associated inspection region windows. Such an implementation addresses the long standing problems associated with performing one or more types of inspection operations in one or more regions of a given sample-object image. By virtue of the hierarchical structure, operation of multiple inspection tools may be performed simultaneously or in any order and inspection of multiple inspection regions may be performed simultaneously or in any order.

20 Claims, 7 Drawing Sheets

SYSTEM AND METHOD FOR BUNDLED LOCATION AND REGIONAL INSPECTION

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

FIELD OF THE INVENTION

This invention relates to inspection systems and methods for machine vision applications, and more particularly relates to techniques and systems that provide improved processing of one or more regions of an object image using one or more types of inspection operations for object feature detection and analysis.

BACKGROUND

In industrial inspections, machine vision is used (1) to sort out products that are blemished, marred or otherwise defective, (2) to identify and locate a shape within the product or the product itself, and/or (3) to classify a given feature or set of features of a product (e.g., as occurs in character recognition—an unknown character is inspected so as to reveal its "class", i.e., so as to reveal what letter or number the character represents). Intensity-based machine vision processes are used to detect flaws and defects in two-dimensional scenes of inspected items. Additionally, such processes can produce metric data that can be used to characterize the quality of an item relative to pre-determined standards. Such intensity-based processes operate well if the content of the scene undergoing inspection is highly repeatable and does not suffer from large amounts of non-linear geometric distortion (i.e., the scene is comprised of "trainable" structure). Such scenes are common in industrially manufactured parts as found in semiconductor production and graphic arts applications.

Generally, intensity-based inspection involves the comparison of a sample image or features derived from it, to an image or features of a known good sample, referred to as an inspection template. In one form, the image undergoing inspection is subtracted from the inspection template image, and differences between the two images are filtered and analyzed to determine whether a flaw or defect is present within the inspected item. Intensity difference based inspection is therefore comprised of two main phases: training and runtime inspection.

During a Training mode, the inspection template is constructed by sampling a plurality of ideal images, each of which represents an item absent of defects or possessing a sufficiently low level of defects that are considered insignificant and or acceptable. During a Runtime inspection mode, the test image, which represents the scene of the item to be analyzed (the inspected item), is first registered and then compared to the inspection template either directly or indirectly through the comparison of derived features. In this context registration or alignment refers to the process by which the coordinate frame transformation between two images of a sample part is determined. Typically, this step is used to account for whatever translation or rotation differences may be exhibited in the presentation of images of multiple samples to be inspected. In at least certain conventional machine-vision systems, there is no distinction between the region of interest (i.e., window) used to train the alignment (registration) template and the region of interest (i.e., window) used to train the inspection template.

However, the conventional usage of the same window creates a number of problems both at training and run-time. For example, derived edge features in a sample-object that are desirable for inclusion in an alignment pattern may not always be desirable for inclusion into the inspection pattern.

This conflict may also occur in situations where small features are important for inspection but considered superfluous for alignment, e.g., when inspecting small text in an image. As a result, the small features will not be detected or retained during training and will show up as extra features at run-time.

The separation of the alignment and inspection regions allows for the exploitation of situations where certain portions of the sample-object to be imaged are predetermined to be stable and defect free making them ideal for alignment and superfluous for inspection. Conversely, if the defects are severe and wide ranging the ability to perform an accurate alignment may be compromised, i.e., to be inspectable a window must be alignable to some level of accuracy. Another advantage obtained is the ability to customize the individual inspection processes to the needs of different areas of the sample to be inspected. As alluded to earlier, there are multiple types of intensity-based inspection processes, which may be more or less appropriate for different inspection goals. By decoupling alignment from inspection these different types of processes may be selectively applied to achieve a more discriminating and efficient inspection performance.

As known to those versed in the art, usage of automated inspection processes invariably requires the selection and tuning of various process specific parameters. An ancillary benefit gained from multiple decoupled inspection regions is the ability to independently tune parameters for identical types of inspection processes in different areas of the sample to be inspected.

SUMMARY OF THE INVENTION

To overcome these limitations, a level of hierarchy may be added so that a single, primary alignment may be performed to generate a coordinate transformation or pose for multiple inspection regions. As a result, a Training mode may include the specification of a single alignment model window and a list of associated inspection region windows.

As a result, an exemplary embodiment of the invention may address the long standing problems associated with performing one or more types of inspection operations in one or more regions of a given sample-object image.

BRIEF DESCRIPTION OF THE DRAWINGS

The benefits of the present invention will be readily appreciated and understood from consideration of the following detailed description of an exemplary embodiment of this invention, when taken with the accompanying drawings, in which same numbered elements are identical and.

DETAILED DESCRIPTION OF EXEMPLARY EMBODIMENT

Figure 1:
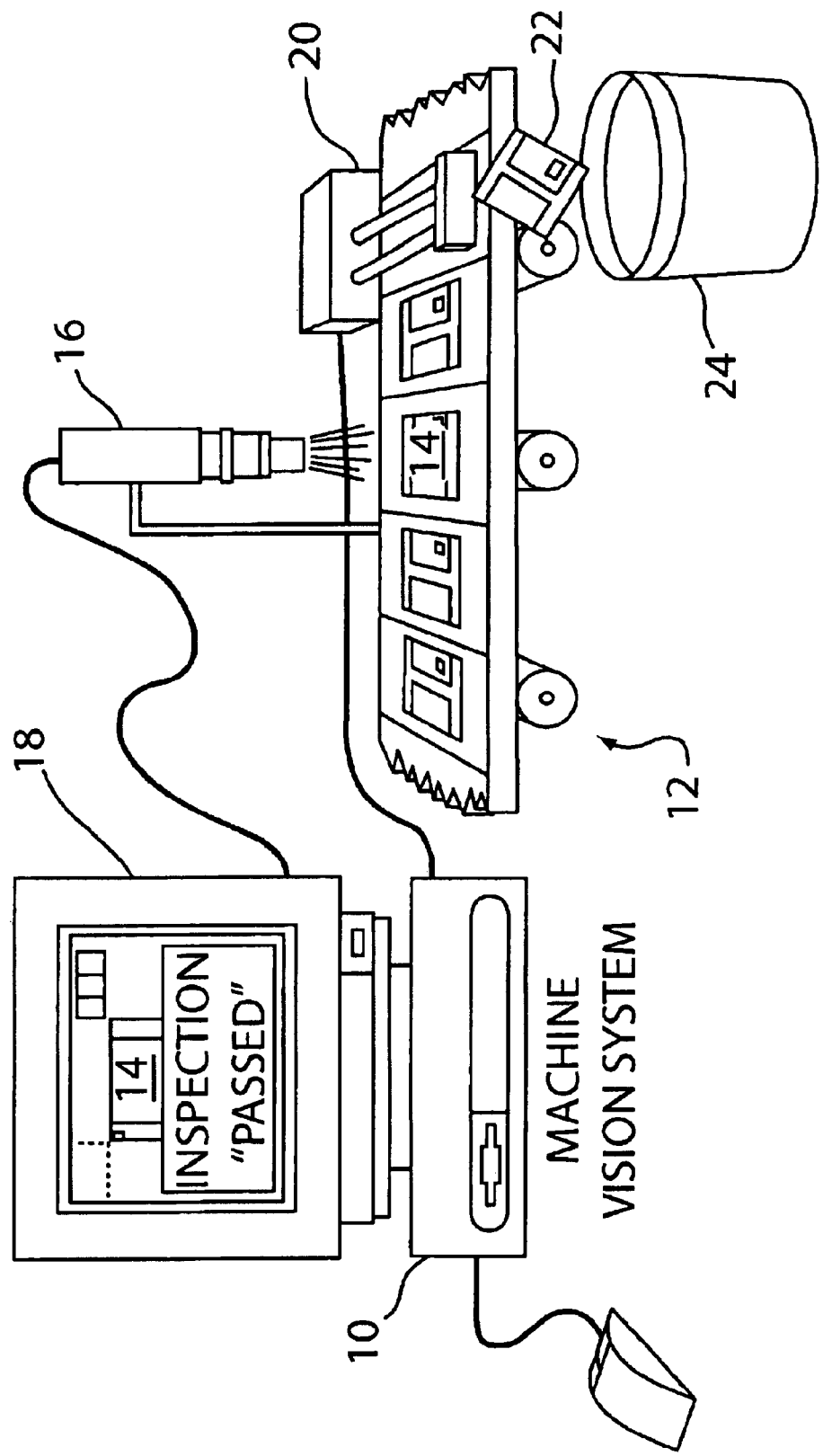
FIG. 1 is an illustrative diagram of an exemplary visual inspection system that can be employed by, for example, a machine vision system for aid in making decisions and providing information about objects in an inspection process such as commonly occur in automated manufacturing in accordance with the exemplary embodiment of the invention.

While the present invention will hereinafter be described in connection with an exemplary embodiment thereof, it should be understood that it is not intended to limit the invention to that embodiment. On the contrary, it is intended to cover all alternatives, modifications and equivalents as may be included within the spirit and scope of the invention as defined by the appended claims.

Systems and methods for visual inspection designed in accordance with the exemplary embodiment of the invention detect and report defects from an acquired image of an inspected sample-object. During a Training mode, systems and methods designed in accordance with the exemplary embodiment of the invention compute template image-data and other statistics from a given set of training sample-object images. During Run-time Inspection mode, systems and methods designed in accordance with the exemplary embodiment of the invention detect and report differences between template image-data and inspection regions in images of run-time sample-objects.

For reference and clarification of the explanation of the exemplary embodiment of the invention, the following explanation of various terms is provided. The term "alignment region" refers to the region used to register training or run-time images. The term "inspection region" refers to the region to be inspected in the training or run-time images. The term "reference image" refers to the sample-object image from which the alignment and inspection regions are selected. Training and run-time images are aligned with this reference image. The term "run-time image-data" refers to the image-data; within the run-time image, to be inspected. The term "standard deviation image-data" refers to the image-data whose pixels are the standard deviations of the pixel values across the sample of training images. The term "statistical training" refers to training from a sample of acceptable instances of the reference image that is going to be inspected at run-time. The term "template image-data" refers to the mean image-data generated by statistical training. The term "threshold image-data" refers to the image-data obtained from the standard deviation image-data used to determine defects.

The exemplary embodiment of the invention is directed at providing a more flexible, faster and more accurate non-contact inspection solution with a scalable architecture that achieves high performance and is more easily extensible for product development than is conventionally available. More efficiency translates to higher inspection throughput.

There are many potential advantages to be realized from implementing the present invention. For example, the inspection region may no longer be required to coincide with the alignment region. Conventionally, if the specified inspected area cannot satisfy alignment training requirements, inspection cannot be performed. Additionally, implementing the present invention may afford greater flexibility to optimize alignment performance. Conventionally, oversized alignment templates must be used to inspect large regions. With the exemplary embodiment such areas can be divided into separate inspect and alignment templates.

Moreover, implementing the present invention with boundary oriented inspection methods allows for usage of different edge selection criteria for inspection regions. Conventionally, default edge selection may apply an alignment-oriented set of heuristics that is not suitable for inspection.

According to the exemplary embodiment of the invention, each inspection region can be customized to perform a different sequence of operations. Inspection results data (e.g., difference images, feature lists) may be obtained on a per inspect area basis thereby providing an additional level of segregation for back end processing.

Conventionally, machine vision systems and methods have coupled the alignment operation with a dedicated inspection operation, which has constrained the methods' applicability. One common problem associated with such methods stems from the fact that users want to inspect small features like printed characters that may be difficult to adequately resolve with existing methods. Additionally, there is no conventional, standard tool to perform inspection for extraneous objects on a scene that is declared to be absent of trainable structure (blank) by the user.

The exemplary embodiment of the present invention extends machine vision capabilities and opens up the possibility for the extension to include any number of new discrete inspection tools, including, for example, texture analysis.

The ability for a user to restrict the alignment operation to only as much of the image area as necessary significantly increases the speed of the location process. Furthermore, users may now inspect only as much of an image as needed by the application, which increases the efficiency of each inspection operation, thereby increasing overall application throughput This "single alignment, multiple inspection" approach also has the advantage of providing greater throughput when implemented on modern multi-threaded, multi-processor platforms.

As mentioned above, the systems and methods designed in accordance with the exemplary embodiment of the invention are designed to detect defects. The systems and methods may create a template image of an object from a set of training images and then compare run-time images of objects to be inspected against the template image. For the purposes of the systems and methods, a defect is any change in the run-time image that is beyond an expected variation in the template image. A defect may be an erroneous or unwanted mark on an object, an incorrectly shaped feature, the absence of a feature, insufficiently marked feature, etc.

Defects may be detected based on different types of inspection methodologies, for example, intensity difference inspection, boundary feature difference inspection and blankness inspection. Intensity difference inspection detects differences in grey-scale pixel value between the trained image and a run-time image. Intensity difference inspection may involve operations such as performing image normalization so that grey-scale pixel value differences caused by uniform lighting variations are not marked as differences. Boundary feature difference inspection detects defects based on differences in contour feature shape or size between the trained image and the run-time image. Blank scene inspection detects scratches and blemishes in image areas that are devoid of trainable structure.

Referring to FIG. 1, in accordance with the present invention, there is provided a visual inspection system that can be employed by, for example, a machine vision system for aid in making decisions and providing information about objects in an inspection process such as commonly occur in automated manufacturing. For example, the visual inspection system can be employed in a machine vision system 10 for a manufacturing line such as a manufacturing line 12, as shown in the figure. Using the inspection system, sample-objects 14, e.g., computer disks can be inspected for compliance with metrics such as size, shape, or the presence of defective characteristics such as scratches, stains, or extraneous printing.

Image(s) of the sample-objects 14 is obtained by camera 16 which is, for example, a CCD camera, connected to the vision system for conversion by the machine vision system 10 to a digital representation, e.g., a greyscale representation, of the computer disk image. The machine vision system 10 can include a display monitor 18 or other means for displaying the acquired sample-object image for a manufacturing line operator. After determining the inspection data of the sample-object 14 under inspection, the machine vision system can provide information about the sample-object's position, geometry, size, or other characteristics.

The machine vision system 10 may, for example, determine if the sample-object under inspection meets quality control standards with regard to size, or inspection features, etc. These standards can be "taught" to the vision system during the Training mode, by way of, producing training templates from examples of sample-objects that meet any established visual inspection quality criteria. The machine vision system 10 can then compare a questionable sample-object under inspection against its pre-trained templates during Run-time Inspection mode, in some manner, to determine if the sample-object satisfies the inspection criteria In this regard, it should be appreciated that the alignment and inspection process provided in the systems and methods designed in accordance with the exemplary embodiment may be used to provide Training mode sample-object image-data. Therefore, the alignment and inspection process may be performed as part of the training process wherein, templates or models are created. It is foreseeable that, during a Training mode, the machine vision system may work in cooperation with a line operator or other individual to produce training templates. However, it should be understood that the machine vision system 10 might also perform automated training template production.

Additionally, the alignment and inspection process may be performed as part of Run-time Inspection Mode, in which a sample-object currently under inspection is compared with a sample-object template or model. It should also be appreciated that, during Run-time Inspection mode, the machine vision system 10 may work as an automated system, with little or no control necessary by a line operator. However, it should be appreciated that, during Run-time Inspection mode, the machine vision system 10 may interact with a line operator so as to allow the line operator to control any or all of timing of acquiring the sample-object image, adjustment of alignment data and subsequent determination of whether the generated inspection results are acceptable.

During Run-time Inspection mode, if the vision system ascertains that the sample-object under inspection satisfies inspection standards, an indication of such a condition can be provided on the display 18 as, e.g., the word "Passed," or can be provided to an operator or automatic indicator on the assembly line in another fashion such as recording into a data log. Alternatively, no indication other than the continuation of the sample-object to later stages of an assembly process may be provided. If the vision system 10 ascertains that a sample-object under inspection does not meet the standard, a mechanical diverter 20 as shown in FIG. 1, connected to the vision system, can be signaled to remove a faulty sample-object 22 from the line when the faulty sample-object 22 is conveyed to the location of the diverter. The diverter might move the faulty sample-object off of the line and into, e.g., a storage receptor 24 for rejected sample-objects. As will be recognized by those skilled in the art, many alternative object inspection and manipulation functions can be provided in a manufacturing line machine vision system like that of FIG. 1.

As mentioned above, the systems and methods designed in accordance with the exemplary embodiment of the invention operates in two distinct modes: Training mode and Run-time Inspection mode. Various phases within these modes will now be further described to provide a better understanding of the operation and capabilities of the invention.

The Training mode includes at least two main phases: the Region Selection Phase and the Statistical Training Phase. During the Training mode, one or more training images are buffered and processed so as to generate statistically based reference data from which deviations can be detected in objects during the Run-time Inspection mode. For intensity difference and blank scene inspection, the output of the Training mode provides template image-data, standard deviation image-data and threshold image-data. For feature difference inspection, the output includes template boundary feature image-data.

During the Region Selection phase, information may be input or accessed regarding what regions within the training images must be trained and for what inspection tools, e.g., intensity difference, blank scene, feature difference, etc. For example, a reference image may be output to a user via a Graphical User Interface (GUI) using the display 18 of FIG. 1 and the GUI may receive inputs from the user to partition the reference image into several inspection regions. When partitioning the reference image, information must be provided that indicates: (1) which region will be used for alignment; and (2) an assignment of an inspection tool to each of the inspection regions (e.g., intensity difference, feature difference or blank scene inspection).

Figure 2:
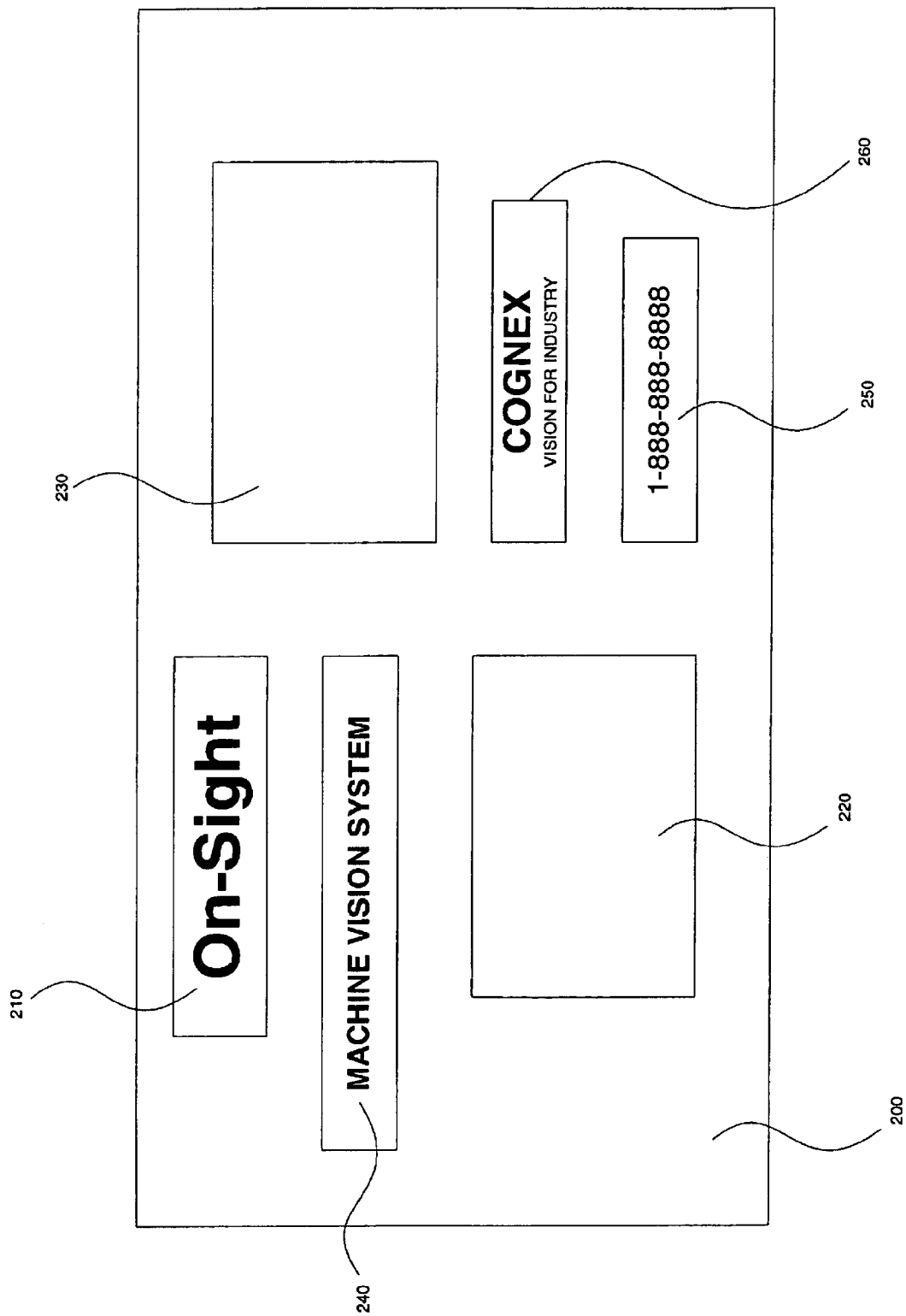
FIG. 2 is an illustrative diagram of an exemplary reference image including multiple inspection regions.

FIG. 2 illustrates a reference image 200 with constituent parts. For example, the image 200 includes an alignment region 210, containing the character string "On-Sight", and two associated inspection regions 220, 230, which may be selected for blankness inspection. The image also includes two associated inspection regions 240, 250, which may be selected for intensity difference inspection, and one region 260, which may be selected for feature difference inspection. According to the exemplary embodiment of the invention, the inspection regions are internally organized as a list by the algorithms executed by the machine vision system 10.

This list is used by the machine vision system 10 to process the image-data so that a level of hierarchy may be added and a single, primary alignment is performed to generate a pose for multiple inspection regions. As a result, training may include the specification of a single alignment model window (e.g., using alignment region 210) and a list of associated inspection region windows (e.g., windows 220–260).

Figure 3:
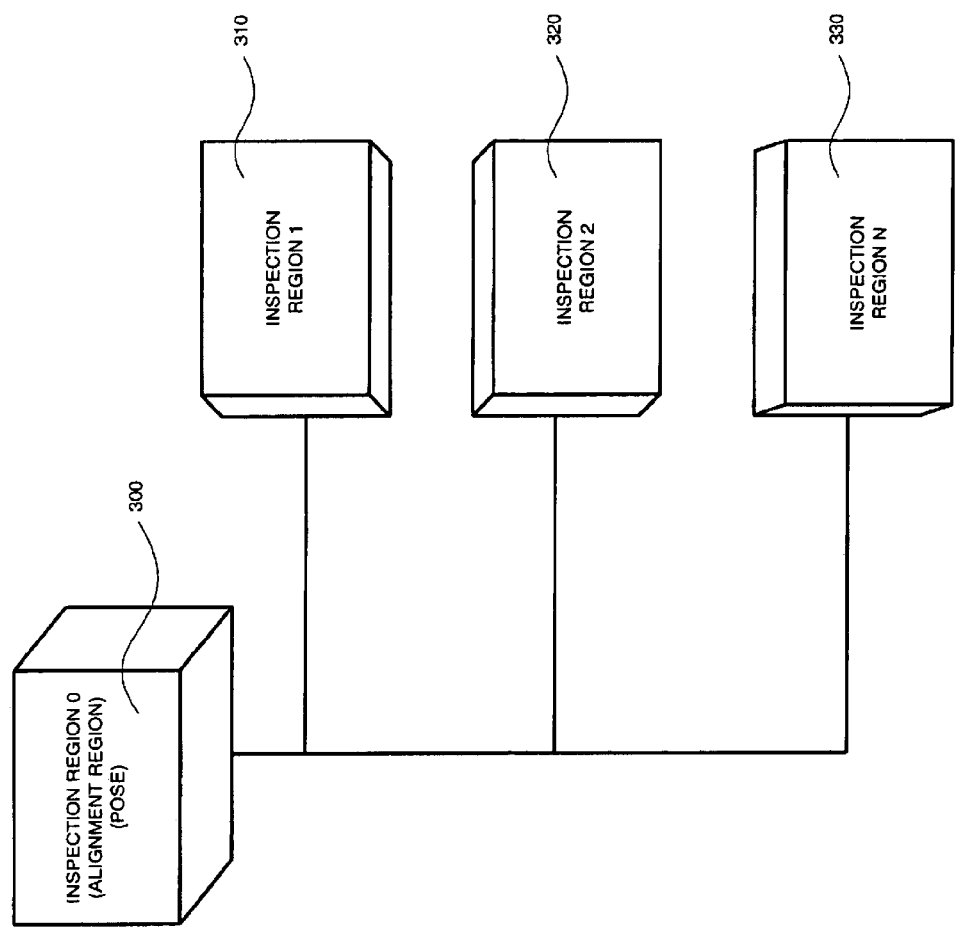
FIG. 3 is an illustrative diagram of the internal organization of the alignment and inspection regions.

FIG. 3 is a conceptual model provided to illustrate the relationship between an alignment region 300 and associated inspection regions 1 through N, 310, 320, 330. As shown in FIG. 3, at the top of the list is always the alignment region 300, which may conceptually be considered inspection region 0. This is the region used to align all training and inspection images with the reference image.

Figure 4:
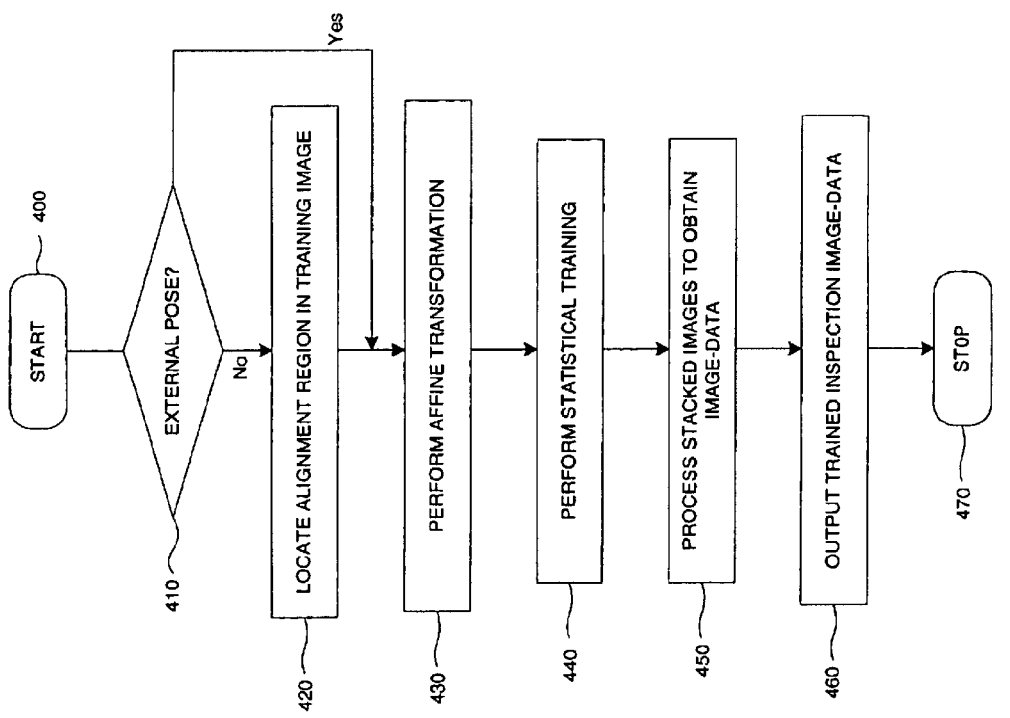
FIG. 4 is a flowchart illustrating the operations of a method for performing machine vision training in accordance with a first exemplary embodiment of the invention.

FIG. 4 illustrates a method designed in accordance with a first exemplary embodiment of the invention in which a training image is reviewed following a set of operations to align the training image with a reference image. The method begins at 400 and control proceeds to 410. At 410, a determination is made whether an external alignment pose has been provided. If an external pose is provided, control proceeds directly to 420. If not, control proceeds directly to 430. At 420, the alignment region is located within the training image producing a pose. Control then proceeds to 430, at which an affine transformation based upon the pose is performed. This pose maps the inspection region in the training image to match the coordinate frame in which it was originally specified. Control then proceeds to 440.

Figure 5:
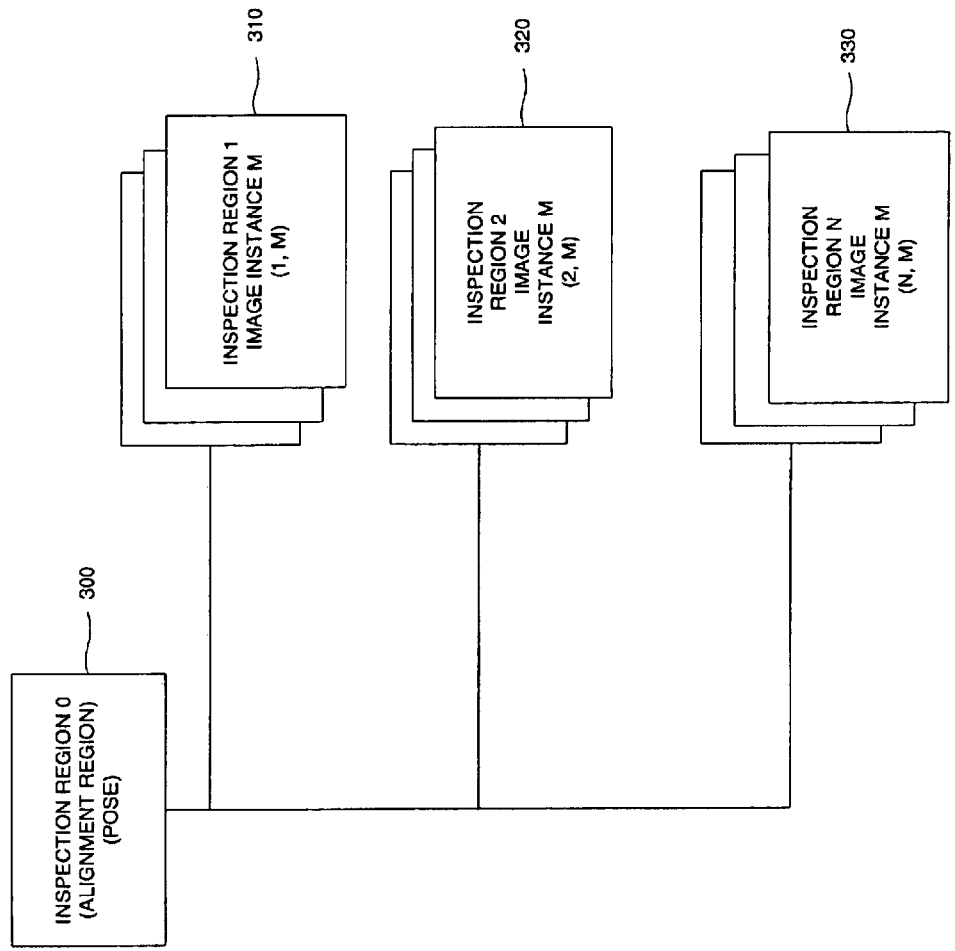
FIG. 5 is an illustrative diagram of the stacked organization provided for the inspection regions associated with a particular alignment region in accordance with the statistical training utilized in accordance with the exemplary embodiment of the invention.

At 440, statistical training is performed. During statistical training, one or more acceptable instances of the images are processed by the machine vision system. Each time a training image instance is processed, it is aligned with the reference image. Methods related to the inspection tools associated with one or more regions within the image instances are then applied to compute and accumulate statistics from each of the image instances. This process is illustrated in FIG. 5.

Control then proceeds to 450, at which the stack of training images is processed to derive the necessary data that will be used for Runtime support of the inspection methods associated with each inspection region. For example, an inspection region associated with the intensity difference inspection method, mean image-data, standard deviation image data and threshold image-data are computed.

Control then proceeds to 460, at which trained image-data are optionally reported based on at least one other criterion, e.g., inspection type, regional index, or regional name. This trained image-data may include template image-data (for example, when the mean image-data is calculated), standard deviation image-data (for example, when the standard deviation image-data is calculated) and/or threshold image-data (for example, when threshold image-data is calculated). Control then proceeds to 470, at which the training method ends. Subsequently, operation in Run-time Inspection mode may be performed.

The total number of inspection scenes, inspection regions in each scene, and their associated dimensions are limited only by the amount of memory available on the vision processor. The types of regional inspection tools may include intensity difference inspection, boundary feature difference inspection, blank scene inspection, software zoom and sub-alignment modes. (See, for example, U.S. patent application Ser. No. 09/585,633, entitled "Method and Apparatus for Inspection for Under-Resolved Features in Digital Images", U.S. Pat. No. 5,850,466, entitled "Golden Template Comparison for Rotated and/or Scaled Images", issued to Schott and Feb. 22, 1995, U.S. Pat. No. 5,640,200, entitled "Golden Template Comparison Using Efficient Image Registration", issued to Michael and filed Dec. 28, 1994, each assigned to Cognex Corporation, incorporated by reference in their entireties.)

The exemplary embodiment of the invention may therefore be implemented to provide the aforementioned inspection tools with greater flexibility and computational efficiency on a regional basis. During Run-time Inspection mode the data generated during the Training mode is used to inspect all run-time images. It is important to understand that the architecture established between the alignment pattern or pose and the various associated inspection regions provided during the Training mode is also used during the Run-time Inspection mode. Therefore, if an alignment region is associated with a plurality of inspection regions and each of those inspection regions is associated with at least one inspection tool, then the Run-time Inspection mode may inspect any of the those inspection regions using their associated inspection tools.

However, it is also important to understand that although any of the inspection regions may be inspected using their associated inspection tools, any of the inspection regions included in the trained architecture may be omitted during Run-time Inspection, for example, under the direction of an operator or based on an automated control algorithm. For example, although a pose may have four inspection regions associated with it by the trained architecture resulting from the Training mode, the Run-time Inspection mode may only perform inspection of run-time images using a subset, say three, of those inspection regions. Moreover, although a given inspection region may have more than one associated inspection tool, not all inspection tools associated with a given inspection region need be executed during Run-time Inspection mode. For example, a particular inspection region may have been associated with intensity difference and feature difference inspection tools during the Training Mode. During Run-time the usage of the intensity difference tool may be temporarily disabled for a particular run image.

Figure 6:
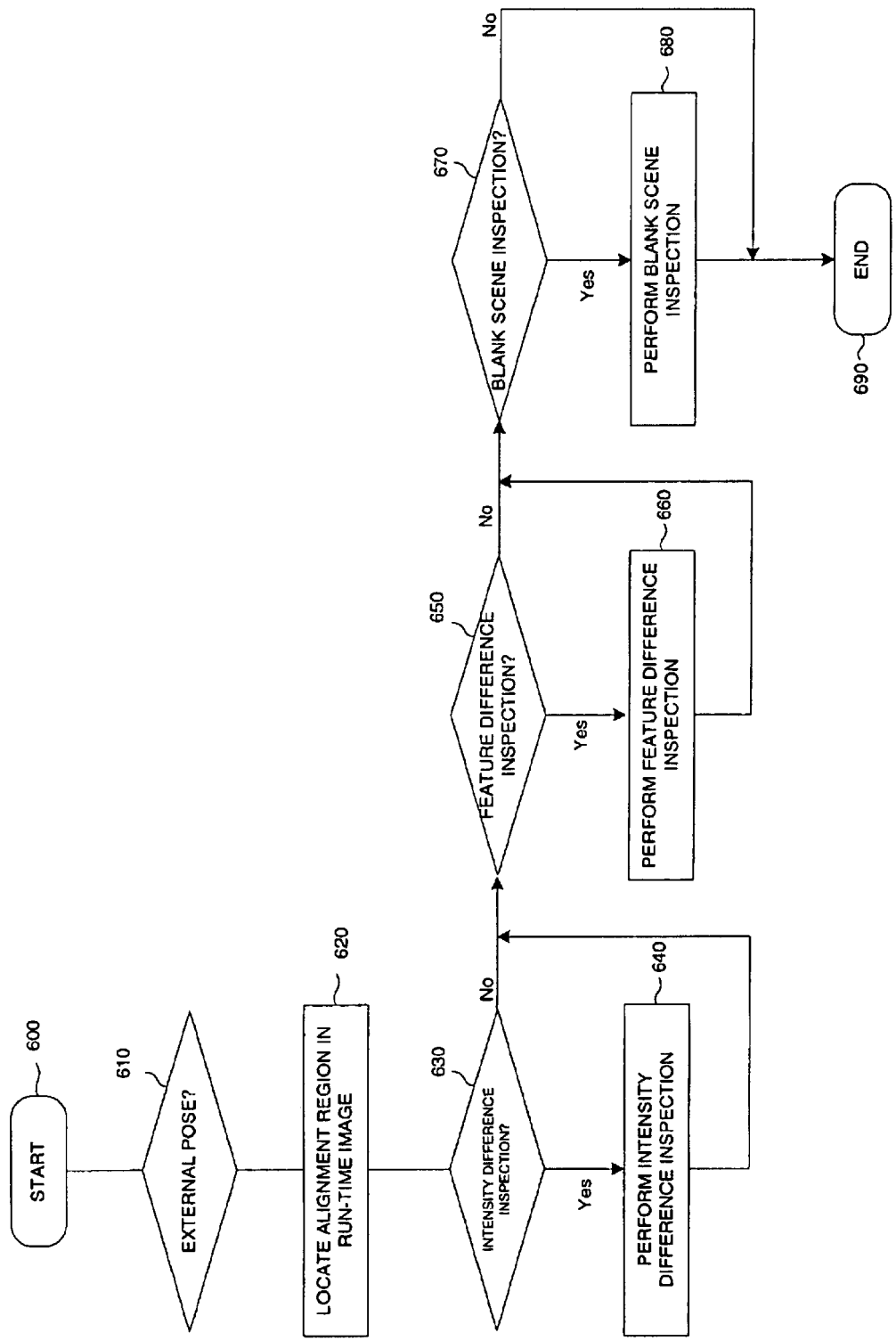
FIG. 6 is a flowchart illustrating the operations of a method for performing machine vision inspection in accordance with the exemplary embodiment of the invention.

FIG. 6 illustrates operations performed during Run-time Inspection mode in accordance with the exemplary embodiment of the invention. The operations begin at 600 and control proceeds to 610. At 610, it is determined whether an operator has provided an external pose. If so, control proceeds directly to 630. If not, control proceeds to 620. At 620, the alignment region in the run-time image is located. Control then proceeds to 630, at which a determination is made whether any of the inspection regions in the trained architecture are associated with the intensity difference inspection. If so, control proceeds to 640. If not, control proceeds to 650.

At 640, intensity difference inspection is performed. Control then proceeds to 650, at which a determination is made whether any of the inspection regions in the trained architecture are associated with the feature difference inspection. If so, control proceeds to 660, at which feature difference inspection is performed. If not, control proceeds directly to 670. At 670, a determination is made whether any of the inspection regions in the trained architecture are associated with the blank scene inspection. If so, control proceeds to 680 at which blank scene inspection is performed. If not, control proceeds to 690, at which the method ends.

It should be appreciated that both the flowcharts of FIGS. 4 and 6 both omit any reference to whether training and inspection are performed on multiple regions in a serial manner or in a parallel manner. This omission is intentional because it should be appreciated by one of ordinary skill in the art that the methods might be implemented in either manner.

Thus, the operations performed at 440–460 of FIG. 4 may be performed so that all inspection regions requiring, for example, intensity difference or blank scene inspection training are processed and, subsequently, all inspection regions requiring, for example, boundary difference training are processed. Alternatively, each inspection region may be processed by performing statistical training and processing before proceeding to a next inspection region.

The inspection regions may be trained in any order that is practical because the operations performed during training for each inspection tool are mutually exclusive of the operations performed during training for any other inspection tool. Moreover, the image-data may be processed to perform training for various inspection tools in any order. Thus, there is no requirement that processing be performed beginning at an inspection region 1 and progressing to inspection region N. Thus, it should be appreciated that training for each inspection region and for each inspection tool may be performed in any order, and both in a serial and/or parallel manner depending on the computing resources available.

Thus, the operations performed for the intensity difference inspection at 640 of FIG. 6 may be performed so that all inspection regions requiring intensity difference inspection are processed, all inspection regions requiring feature difference inspection are processed at 660 and, subsequently, all inspection regions requiring blank scene inspection are processed at 680. Alternatively, each inspection region may be processed by performing operations at 640–680 before proceeding to a next inspection region.

Moreover, the inspection regions may be processed inspected in any order that is practical because the operations performed during inspection by each inspection tool are mutually exclusive of the operations performed during inspection by any other inspection tool. Moreover, the image-data may be processed to perform training in any order. Thus; there is no requirement that processing be performed beginning at an inspection region 1 and progressing to inspection region N. Thus, it should be appreciated that inspection by each inspection tool and for each inspection region may be performed in any order, and both in a serial and/or parallel manner.

Figure 7:
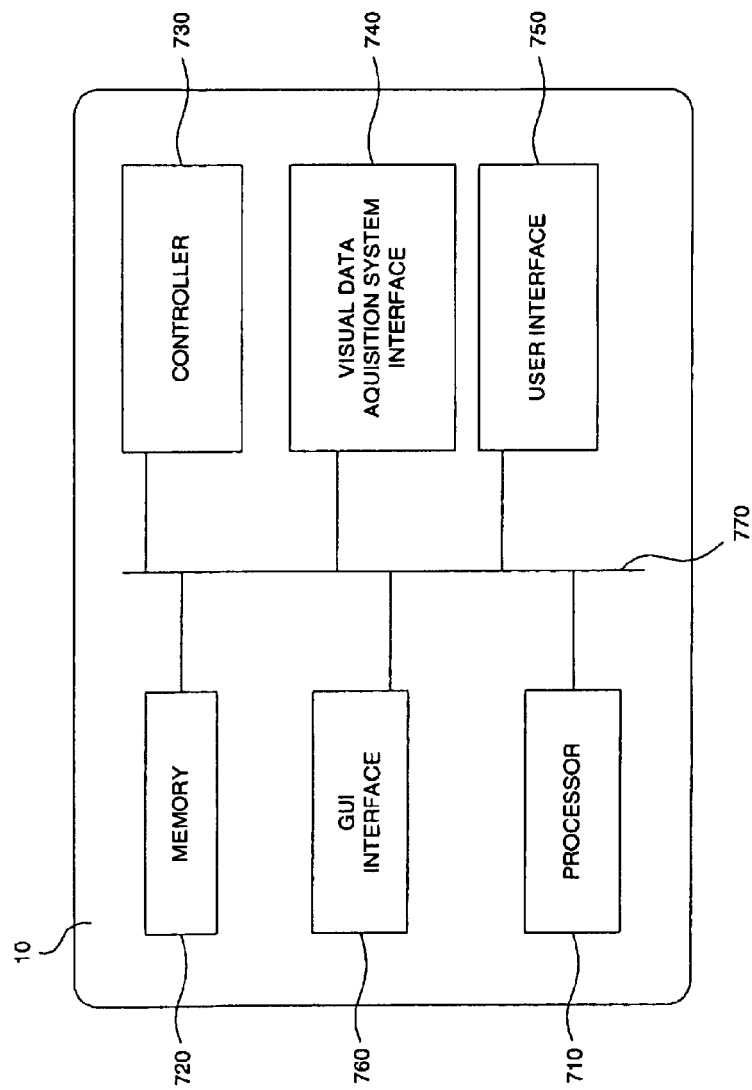
FIG. 7 is an illustrative diagram of the elements of the visual inspection system 10 illustrated in FIG. 1.

FIG. 7 is a functional block diagram of one implementation of the machine vision system 10 illustrated in FIG. 1. As shown in FIG. 7, the machine vision system 10 may include a processor 710, a memory 720, a controller 730, a visual data acquisition system interface 740, a user interface 750, a GUI interface 760 and a communication/data/control bus 770 that couples elements 710–760 together and allows for cooperation and communication between those elements.

The memory 720 may be preferably implemented with a sufficient quantity of RAM, for example, 32 to 64 megabytes.

The visual data acquisition system interface 740 may include both hardware and software to allow the system 10 to communicate with a visual data acquisition system, which may include, for example, camera 16 illustrated in FIG. 1.

Processor 710 works in cooperation with the controller 730 to control operation of the other elements 760–780. In cooperation with the controller 730, the processor 710 may fetch instructions from memory 720 and decode them, which may cause the processor 710 to transfer data to or from memory 720 or to work in combination with the user interface 770 (for example, to input or output information), the visual data acquisition system interface 760 (for example, to input image-data from or output instructions to the visual data acquisition system), the GUI interface 780 (for example, to provide inspection information to the user via, for example, the display 18), etc.

Controller 730 operates to control operation of the other elements 720 and 740–770 of the system 10. It should be appreciated that the controller 730 may be implemented with the processor 710, for example, in a central processing unit, or other similar device. It should also be appreciated that the processor 710 may be implemented as more than one processor, for example, a dual processor.

The user interface 770 may include, for example, hardware and software for cooperating with the display 18, a keyboard and mouse, etc. Moreover, the user interface 770 may include a speaker and microphone, not shown, for outputting and inputting information to and from a user. The user interface 770 may operate in conjunction with the processor 710 and controller 730 to allow a user to interact with software programs stored in the memory 720 and used by the processor 710 so as to perform the operations illustrated in FIGS. 4 and 6.

It should be understood that the machine vision system 10 can be implemented, for example, as portions of a suitably programmed general-purpose computer. It should also be understood that the system may be implemented, for example, as physically distinct hardware circuits within an ASIC. The particular form of the system 10 will take is a design choice and will be obvious and predicable to those skilled in the art. For example, although the system 10 has been described as a general-purpose computer, for example, a personal computer, it is foreseeable that the system 10 may be a special purpose embedded processor.

While this invention has been described in conjunction with a specific embodiment outlined above, it is evident that many alternatives, modifications and variations will be apparent to those skilled in the art. Accordingly, the exemplary embodiment of the invention, as set forth above, is intended to be illustrative, not limiting. Various changes may be made without departing from the spirit and scope of the invention.

For example, it should be appreciated that during Training Mode, although a location of the alignment pattern in a first training image processed during statistical training may be used to set a default location of the alignment pattern in relationship to any or all subsequent training images, it is also foreseeable that the location of the alignment pattern may be dynamically changed by, for example, the external selection of an operator or an automated or semi-automated operation that utilizes fiducial marks. For example, the alignment region may utilize operations and equipment described in U.S. Pat. No. 5,978,521, entitled "Machine Vision Methods Using Feedback to Determine Calibration Locations of Multiple Cameras that Image a Common Object", issued Nov. 2, 1999 to Wallack, et al. and commonly assigned to Cognex Corporation.

We claim:

1. A method of training an object visual inspection system, the method comprising:

specifying a single region of alignment interest within an object image;

associating the single region of alignment interest with a plurality of regions of inspection interest within the object image;

associating each of the plurality of regions of inspection interest with at least one respective inspection tool, at least one of the plurality of regions of inspection interest being associated with a first inspection tool that is different from a second inspection tool that is associated with another one of the plurality of regions of inspection interest; and training, for each of the plurality of regions of inspection interest, each of the at least one respective inspection tools.

2. The method of claim 1, wherein training each of the at least one respective inspection tools requires performing statistical training using a plurality of training images.

3. The method of claim 1, wherein training, for each of the plurality of regions of inspection interest, is performed in any order among regions of inspection interest.

4. The method of claim 1, wherein training of the first inspection tool is performed simultaneously with training of the second inspection tool.

5. The method of claim 1, wherein training of the first inspection tool is performed either before or after training of the second inspection tool.

6. A method of performing inspection using an object visual inspection system, the method comprising:

aligning run-time image-data with trained image-data using a specified region of alignment interest within the run-time image data;

identifying a plurality of regions of inspection interest within the run-time image-data using the specified region of alignment interest; and inspecting at least one region of the plurality of regions of inspection interest using at least one inspection tool associated with the at least one region of inspection interest, the at least one region of the plurality of regions of inspection interest being associated with a first inspection tool that is different from a second inspection tool associated with another region of the plurality of regions of inspection interest.

7. The method of claim 6, wherein inspecting the at least one region of inspection interest is performed using trained image-data produced during a training mode in which a region of alignment interest is associated with the plurality of regions of inspection interest, which are each associated with at least one inspection tool.

8. The method of claim 6, wherein inspection of each of the plurality of regions of inspection interest is performed in any order.

9. The method of claim 6, wherein inspection using the first inspection tool is performed simultaneously with training for the second inspection tool.

10. The method of claim 6, wherein inspection using the first inspection tool is performed either before or after training for the second inspection tool.

11. A visual inspection system comprising:

a machine vision system coupled to a camera, the machine vision system including:

a display that displays the acquired image-data;

a processor coupled to the display via a bus;

a memory buffer coupled to the display and the processor via the bus;

a visual data acquisition system interface coupled to the display, processor and memory buffer via the bus and to the camera;

a user interface coupled to the display, processor, memory buffer and visual data acquisition system via the bus;

a controller coupled to and controlling cooperation of the display, the processor, the memory buffer, the visual data acquisition system interface and the user interface via the bus;

wherein, under the direction of the controller, the processor fetches instructions from the memory buffer that direct the controller to control the visual data acquisition system interface, user interface, and processor to;

specify a region of alignment interest within the acquired image-data, associate the region of alignment interest with a plurality of regions of inspection interest within the acquired image-data, associate each of the plurality of regions of inspection interest with at least one inspection tool, at least one of the plurality of regions of inspection interest being associated with a first inspection tool that is different from a second inspection tool associated with another one of the plurality of regions of inspection interest, and perform training for each of the plurality of regions of inspection interest for each of the associated inspection tools.

12. A visual inspection system comprising:

a camera that acquires image-data including a digital representation of objects; and the machine vision system as recited in claim 11 coupled to the camera.

13. The machine vision system of claim 11, wherein the controller controls the processor to perform training for the at least one inspection tool by performing statistical training with reference to a plurality of training images based on instructions stored in the memory buffer.

14. The machine vision system of claim 11, wherein the controller controls the processor to perform training for the first inspection tool simultaneously with training for the second inspection tool.

15. The machine vision system of claim 11, wherein, based on the instructions stored in the memory buffer, the controller controls the processor to align run-time image-data with trained-image-data using a region of alignment interest, identify a plurality of regions of inspection interest within the run-time image-data based on the region of alignment interest, and perform inspection of at least one of the plurality of regions of inspection interest using at least one inspection tool associated with the at least one region of inspection interest.

16. The machine vision system of claim 11, wherein the controller controls the processor to perform inspection of the at least one region of inspection interest based on trained image-data produced during a training mode in which an region of alignment interest is specified and associated with the plurality of regions of inspection interest, which are each associated with at least one inspection tool, and training is performed for the inspection tools associated with the plurality of regions of inspection interest.

17. The machine vision system of claim 16, wherein the trained image-data includes template image data.

18. The machine vision system of claim 16, wherein the trained image-data includes standard deviation image-data.

19. The machine vision system of claim 16, wherein the trained image-data is produced by statistical training.

20. The machine vision system of claim 11, wherein the at least one inspection tool is one of an intensity difference inspection tool, feature difference inspection tool or blank scene inspection tool.

* * * * *